Aug. 15, 1944.  C. T. McGILL  2,355,815
FLUID CONDITIONING APPARATUS
Original Filed May 20, 1938
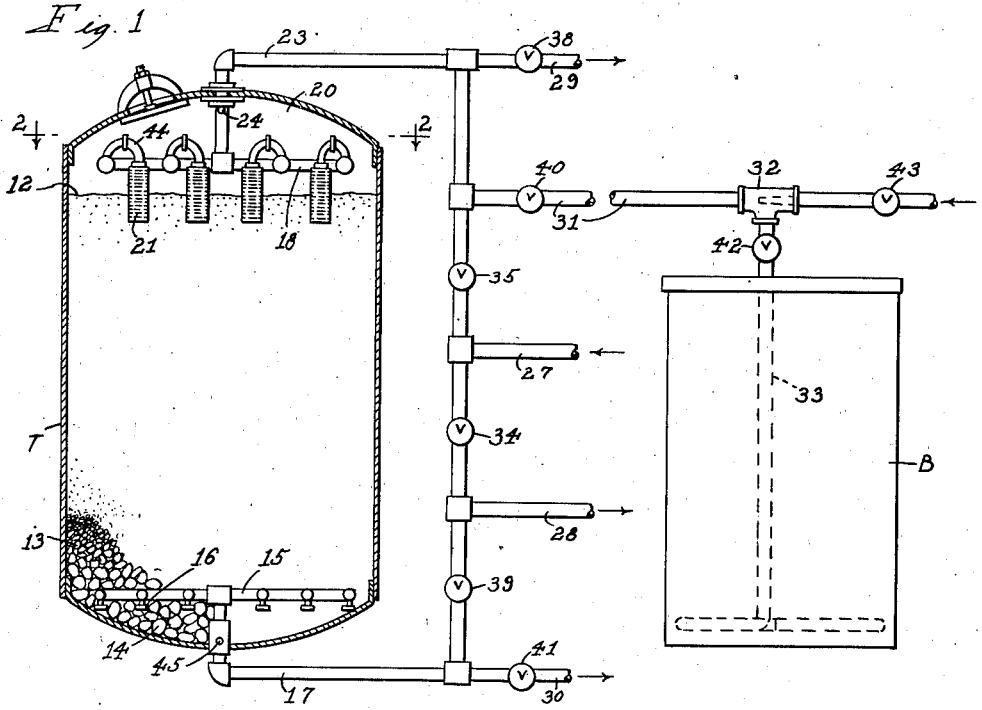
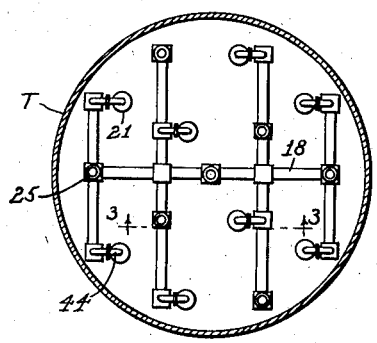
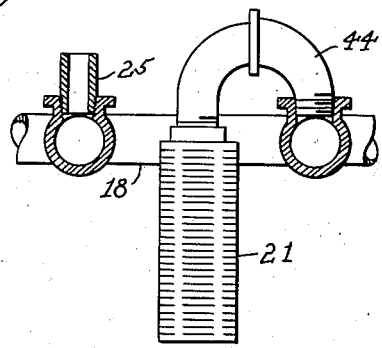
Inventor:
Chester T. McGill
By
McCanna, Wintercoen & Morsbach
Attys.

Patented Aug. 15, 1944

2,355,815

UNITED STATES PATENT OFFICE 2,355,815

FLUID CONDITIONING APPARATUS

Chester T. McGill, Elgin, Ill.

Original application May 20, 1938, Serial No. 208,994. Divided and this application December 22, 1941, Serial No. 423,995

7 Claims. (Cl. 210—24)

This application is a division of my copending application Serial No. 208,994, filed May 20, 1938.

This invention relates to fluid conditioning apparatus such as water softeners and filters.

Downflow water softeners and filters are subject to the objections that the accumulated silt and other foreign matter on the top of the bed results in considerable pressure loss, necessitating backwashing at frequent intervals to clear out these accumulations. Then, too, while downflow operation would permit filling the tank or tanks almost to the top with the water softening or filtering material and thus take full advantage of the tank capacity, the flow rate during backwashing has heretofore dictated the necessity for cutting down the depth of material or increasing the height of the tank in order to provide a freeboard space in the tank over the material sufficient to allow for the expansion of the material during backwashing and minimize loss of material to the drain during backwashing. In these earlier designs it was also important to use fairly coarse softening material having a lower exchange capacity per cubic foot, because finer material would wash out too readily. It is, therefore, the principal object of my invention to provide water conditioning apparatus of such improved design that the freeboard space can be drastically reduced, permitting use of more water softening or filtering material with attendant advantages, while finer, higher capacity softening material may be employed, and backwashing may be done at even higher than usual flow rates without loss of filtering or softening material. It is also an aim of the invention to provide a similar construction in upflow softeners to permit faster flow of water through the softening material than is permitted in conventional type softeners, without danger of loss of material.

Another main object of this invention is to permit passage of water through the coarser material of a bed in backwashing or softening at a faster rate than it is passed through the finer material in the upper portion of the bed. In carrying out this object of my invention, I provide outlets at different levels in the top of the tank for regulating the discharge of water through each outlet level in backwashing so as to permit a fast flow rate, sufficient to thoroughly expand the material and efficiently wash the same, but avoid loss of the material to the drain by division of the flow between the outlets, the lower outlets having strainers thereon to retain the material while allowing escape of some of the finer particles of sediment, while the uppermost outlets, where there is a lower flow rate, has nozzles with larger openings to permit removal of all remaining sediment without danger of loss of material, since the flow rate at this highest elevation is slowest. I have found it practical, for example, to provide strainers at one elevation and open nozzles at a higher elevation, both communicating with the same outlet pipe.

These and other objects and advantages of the invention will appear in the following description, in which reference is made to the accompanying drawing, wherein—

Figure 1 is a vertical section through a water softener made in accordance with my invention;

Fig. 2 is a horizontal section on the line 2—2 of Fig. 1; and

Fig. 3 is a sectional detail on the line 3—3 of Fig. 2 on a larger scale.

The same reference numerals are applied to corresponding parts throughout the views.

In the operation of conventional water softeners and filters, it is well known that the granular material grades itself in the upflow of water through the bed, so that the coarsest material is left on the bottom and the finest is found on top. It is difficult to keep a bed of this material in a clean and active condition unless one can cause the water to flow rapidly through it to keep the material loose and free to shift about, instead of becoming matted and packed. Such rapid flow heretofore called for additional freeboard space with a consequent added cost for the installation, and in some instances where an unusually high rate of flow was specified, the usual requirement of a fifty per cent (50%) or more allowance for freeboard space frequently called for more head room than was available in the installation. The present invention, as previously indicated, provides efficient operation with greatly reduced freeboard space, and despite rapid flow rates and use of finer material avoids loss of filtering or softening material during backwashing, or the carrying of softening material to the service line in the case of an upflow softener operating with high flow rates, the resulting units being of smaller height as compared with old units of the same capacity.

Figure 1 shows a tank T, which, while it is herein shown in connection with a brine tank B in a downflow water softener installation, may so far as the equipment therein is concerned be considered in the same light as a filter, although of course the granular material indicated at 12 will in this case be zeolite water softening material. The tank's equipment otherwise, however, is adapted for filtering. The bed 12 is supported on a graded gravel bed 13 over a coarse bed 14 in which is disposed a bottom manifold 15 fitted with nozzles 16 and communicating with the pipe 17 extended into the center of the bottom of the tank. A manifold 18 in the small freeboard space 20 in the top of the tank carries a plurality of strainers 21 on U-connections 44 at a lower level with relation to nozzles 25 projecting upwardly from the manifold. The strainers 21 project downwardly into the top of the bed to the extent indicated. A pipe 23 extends downwardly through the center of the top of the tank and supports the manifold 18 in the position shown. This pipe has an air vent 24 therein near the top of the tank and permits the discharge of any air or gas that might tend to accumulate in the top of the tank as well as the discharge of particles of sediment which might float on the surface of the water above the nozzles 25. The nozzles 25 are nipples and have fairly unrestricted openings, whereas the strainers 21 have fine slits made therein, large enough only to allow passage of minute particles of sediment with the flow of water but small enough to retain even the finer water softening material in the tank. Holes 45 are provided in the bottom connection 17 just above the bottom wall of the tank to permit discharge of water below the manifold 15 during backwash of the bed 12 of filtering or water softening material, whereby to avoid the possibility of any stagnation in the bottom of the tank. These openings during downflow serve to provide an outlet at the very bottom of the tank to further avoid a condition of stagnation. The raw water is delivered through a pipe 27 and the softened water is discharged to the service system through the pipe 28. Pipes 29 and 30 communicate with the drain, and the pipe 31 communicates with the ejector nozzle 32 to conduct brine from the tank B through the pipe 33 communicating with the bottom of the tank. There are valves 34, 35, 38 and 39 to control the flow of water during softening and backwashing, and other valves 40—43 to control the brining and rinsing operations, in conjunction, of course, with the other valves.

In operation, during softening operation, valves 34, 38, 40, 41 and 42 are closed. Valves 35 and 39 are open. This permits free flow of raw water from supply line 27 through pipe 23 into the tank T through the nozzles 25 on the manifold 18 for passage downwardly through the bed 12 and out through the nozzles 16 on manifold 15 through pipe 17 to the service system communicating with the pipe 28. After the unit has been operated long enough to require regeneration, the direction of flow is reversed by closing valve 35 and opening valves 34 and 38. This permits the incoming raw water from pipe 27 to enter the bottom of the tank and flow upwardly through the bed 12. The strainers 21 being at a lower elevation than the nozzles 25 provide a first series of outlets so as to cut down the rate of flow toward the nozzles 25 to such an extent that the softening or filtering material during backwashing will not rise above the level of the strainers 21 and there will be no danger of material being lost to the drain. The strainers 21, as previously described, are constructed to permit outflow of water and sediment while retaining the softening material in the tank. The remaining sediment being lighter than the softening material is carried into the freeboard space 20 with the remaining portion of the water going to the nozzles 25. The two streams will, of course, unite in the manifold 18 and go through the pipe 23 and be conducted to the drain pipe 29 and thence to the sewer or other waste or drain receptacle. With this arrangement it will be seen that the water can be passed through the coarser material of the bed 12 at a rate of say ten gallons per minute per square foot area, sufficient to expand the whole bed so that no portions thereof are left matted and packed and still the rate of outward flow through the strainers and nozzles may be five gallons per minute per square foot area, assuming that half of the flow goes through the strainers 21 and the other half through the nozzles 25, although of course the flow may be divided in other proportions, depending upon the relationship of the total area of outlet afforded by the nozzles 25 in relation to the total area of outlet afforded by the slits in the strainers 21. The finer particles of water softening material will not be carried up into the upper portion of the freeboard space 20 and there is accordingly no likelihood of loss of such material to the drain. In other words, the rate of flow in the upper portion of the freeboard space is less than the settling rate of substantially all of the water softening material in the tank, and the nozzles 25 are elevated with respect to the openings in the strainers sufficiently so that the finer particles of water softening material will not be entrained in the water flowing outwardly through said nozzles. Different elevations will, of course, be required for the nozzles for different water softening materials having different specific gravities. The flow rate toward the nozzles 25 in the head space 20 is just enough to carry away the sediment freed by the rapid backwash flow of water through the bed, such sediment being lighter than the water softening material. Once the accumulated sediment has been cleared out in this way and the bed broken up preparatory to the salt wash, brine is introduced by opening the valves 40—43 while all of the other valves shown are closed, raw water then entering through valve 43 and pipes 31 and 23, and the waste water being conducted to the drain through valve 41 and pipe 30. In the introduction of brine, the inverted U-connections 44 are of advantage in preventing the brine from entering the strainers 21, substantially all of the brine being discharged through the nozzles 25, because of the fact that the nozzles 25 terminate in a horizontal plane that is low with respect to the middle portion of the U-connections 44, as clearly appears in Fig. 3. After enough brine has been added, valve 42 is closed and the brine is washed out in the usual way to the drain through valve 41. When the water issuing from valve 41 is soft, the unit can be placed back into service.

Where the bed 12 is purely a filter bed and there is no brine tank associated with the tank T, it is believed to be obvious that the operation as described above for backwashing preparatory to the salt wash and rinse would correspond to the backwashing of the filter bed to restore it to its initial clean state after the accumulated sediment on the top of the bed has dictated the necessity for backwashing.

The unit shown may also be operated as an upflow softener, in which event raw water is supplied through the pipe 28 and softened water is discharged to the service system through pipe 27. The pipe 31 in such event delivers brine into the top of the tank if the unit is to be regenerated by downflow through the bed. On the other hand, if upflow is to be employed, the brine may be injected through the pipe 39 and discharged through pipe 29 to the drain.

It is believed the foregoing description conveys a good understanding of the objects and advantages of my invention. The appended claims have been drawn with a view to covering all legitimate modifications and adaptations.

I claim:

1. Apparatus for conditioning fluid in liquid form comprising a tank containing a bed of fluid conditioning material, fluid distributing means in the lower part of said tank, said tank having a freeboard space in the top thereof above the bed of fluid conditioning material, a single fluid collecting manifold in the upper portion of said tank, conduit means for connecting said manifold and the aforesaid fluid distributing means with a source of fluid supply, to drain, and to a point of use, one or more tubular members communicating with and carried by the manifold providing relatively large outlet openings on said manifold at a predetermined elevation above the top of the bed adapted for continuously allowing flow of fluid therethrough whenever there is fluid flow through the tank, and one or more strainer elements on and communicating with the manifold but disposed below the elevation of the last named openings having relatively small flow passages, the strainer elements being adapted to retain the fluid conditioning material while permitting outflow of fluid from the tank through the manifold, said strainer elements serving to reduce the rate of flow of fluid at said relatively large outlet openings to a rate below the settling rate of substantially all of the fluid conditioning material in the tank and allow enough flow at said relatively large outlet openings for entrainment of sediment with the fluid entering said openings.

2. Apparatus as set forth in claim 1, wherein the conduit means includes a conduit in the tank extending downwardly from the top of the tank to and communicating with the manifold and having an air vent opening provided therein adjacent the highest point in the tank and communicating with the tank.

3. Apparatus for conditioning fluid in liquid form comprising a tank containing a bed of fluid conditioning material with a predetermined freeboard space left thereabove, a fluid distributing and collecting means in the lower part of said tank, a fluid distributing and collecting means in the upper part of said tank, and conduit means connecting the aforesaid two means with a source of fluid, to drain, and to a point of use, said fluid distributing and collecting means in the upper part of said tank comprising a single substantially horizontal manifold, a nozzle on the manifold having a relatively large aperture, a strainer carried by and projecting downwardly from said manifold having flow passages all relatively small in relation to the nozzle aperture, the nozzle having its large aperture at an elevation above the small flow passages of said strainer and said strainer causing a reduction in the rate of flow at the nozzle aperture to a rate below the settling rate of substantially all of the fluid conditioning material in the tank but allowing enough flow at said nozzle aperture for entrainment of sediment with the fluid entering said aperture, and an inverted tubular U-connection connecting the top portion of the strainer with the top portion of the manifold.

4. Apparatus for conditioning fluid in liquid form comprising a tank containing a bed of fluid conditioning material with a predetermined freeboard space left thereabove, a fluid distributing and collecting means in the lower part of said tank, a fluid distributing and collecting means in the upper part of said tank, and conduit means connecting the two aforesaid means with a source of fluid supply, to drain, and to a point of use, said upper fluid distributing and collecting means comprising a strainer having a multiplicity of relatively small openings permitting outflow of fluid from said tank to said conduit means but retaining said conditioning material in said tank, and a tubular member communicating with and extending from the strainer and connected to the aforesaid conduit means to conduct fluid thereto from said strainer, said tubular member having a relatively large outlet opening communicating with the freeboard space in the tank above the level of the strainer adapted for continuously allowing flow of fluid therethrough whenever there is fluid flow through the tank, said strainer causing a reduction in the flow at said large outlet opening to a rate below the settling rate of substantially all of the conditioning material in the tank and allowing enough flow at said outlet opening for entrainment of sediment with the fluid entering said opening.

5. Fluid treatment apparatus for conditioning fluid in liquid form, comprising a tank containing a bed of fluid conditioning material with a predetermined freeboard space left thereabove, a single manifold disposed in the upper portion of said tank, fluid distributing and collecting nozzles on and communicating with said manifold having relatively large openings in the freeboard space for inflow and outflow of fluid therethrough into or out of said manifold, strainer elements on and communicating with said manifold having relatively small openings which in the outgo of fluid to said manifold retain the fluid conditioning material in the tank, each of said nozzle openings being much larger than any of said strainer openings to permit escape of sediment with the fluid flowing outwardly through said nozzles, the nozzle openings being adapted for continuously allowing flow of fluid therethrough whenever there is fluid flow through the tank, the nozzle openings being elevated with respect to the strainer openings sufficiently so that the flow is reduced at said nozzle openings to a rate below the settling rate of substantially all of the conditioning material in the tank but allow enough flow at said nozzle openings for entrainment of sediment with the fluid entering said nozzle openings, fluid distributing means in the bottom portion of the tank, conduits for conducting fluid from a source of supply to said manifold and the fluid distributing means and for conducting fluid from the tank to a point of use, and to waste, and valve means for controlling the flow of fluid through said conduits.

6. Fluid treatment apparatus for conditioning fluid in liquid form, comprising a tank containing a bed of fluid conditioning material with a predetermined freeboard space left thereabove, a single manifold disposed in the upper portion of said tank, fluid distributing and collecting nozzles on and communicating with said manifold having relatively large openings in the freeboard space for inflow and outflow of fluid therethrough into or out of said manifold, elongated strainer elements on and communicating with said manifold having relatively small openings substantially throughout the length thereof which in the outgo of fluid to said manifold retain the fluid conditioning material in the tank, each of said nozzle openings being much larger than any of said strainer openings to permit escape of sediment with the fluid flowing outwardly through said nozzles, the nozzle openings being adapted for continuously allowing flow of fluid therethrough whenever there is fluid flow through the tank, said nozzles projecting upwardly from said manifold and said strainers projecting downwardly from said manifold far enough to reduce the flow at said nozzle openings to a rate below the settling rate of substantially all of the conditioning material in the tank but allow enough flow at said nozzle openings for entrainment of sediment with the fluid entering said nozzle openings, fluid distributing means in the bottom portion of the tank, conduits for conducting fluid from a source of supply to said manifold and the fluid distributing means and for conducting fluid from the tank to a point of use and to waste, and valve means for controlling the flow of fluid through said conduits.

7. Fluid treatment apparatus for conditioning fluid in liquid form, comprising a tank containing a bed of fluid conditioning material with a predetermined freeboard space left thereabove, a single manifold disposed in said freeboard space, fluid distributing and collecting nozzles on said manifold having relatively large openings for inflow and outflow of fluid therethrough into or out of said manifold, strainer elements on said manifold having relatively small openings which in the outgo of fluid to said manifold retain the fluid conditioning material in the tank, each of the nozzle openings being much larger than any of the strainer openings to permit escape of sediment with the fluid flowing outwardly through said nozzles, said nozzles projecting upwardly from said manifold, whereby to dispose the aforesaid relatively large openings in a predetermined horizontal plane above the manifold, and an inverted tubular U-connection connecting the top portion of each of said strainers with said manifold for support of the strainers so that the small openings thereof are below the level of the large openings in said nozzles, whereby to reduce the flow at said nozzle openings to a rate below the settling rate of substantially all of the conditioning material in the tank but allow enough flow at said nozzle openings for entrainment of sediment with the fluid entering said nozzle openings, the horizontal plane of said nozzle openings being low with respect to the middle portions of said U-connections, whereby fluid entering the tank from said manifold is discharged from the nozzles substantially exclusively, fluid distributing means in the bottom portion of the tank, conduits for conducting fluid from a source of supply to said manifold and the fluid distributing means and for conducting fluid from the tank to a point of use and to waste, and valve means for controlling the flow of fluid through said conduits.

CHESTER T. McGILL.